(12) United States Patent
Sun et al.

(10) Patent No.: US 9,232,594 B2
(45) Date of Patent: Jan. 5, 2016

(54) BACKLIGHT CIRCUIT CONTROL METHOD, BACKLIGHT CIRCUIT AND BOOSTER CIRCUIT

(75) Inventors: Qinli Sun, Shenzhen (CN); Haibo She, Shenzhen (CN); Wengang Zhang, Shenzhen (CN); Fengpeng Liu, Shenzhen (CN); Mao Liang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 302 days.

(21) Appl. No.: 13/880,016

(22) PCT Filed: Feb. 11, 2011

(86) PCT No.: PCT/CN2011/070940
§ 371 (c)(1),
(2), (4) Date: Apr. 17, 2013

(87) PCT Pub. No.: WO2012/051817
PCT Pub. Date: Apr. 26, 2012

(65) Prior Publication Data
US 2013/0285575 A1     Oct. 31, 2013

(30) Foreign Application Priority Data

Oct. 20, 2010   (CN) .......................... 2010 1 0514368

(51) Int. Cl.
*H05B 33/08* (2006.01)
*G02F 1/1335* (2006.01)
*G09G 3/34* (2006.01)
*G09G 3/36* (2006.01)

(52) U.S. Cl.
CPC .......... *H05B 33/0845* (2013.01); *G02F 1/1336* (2013.01); *G09G 3/3406* (2013.01); *H05B 33/086* (2013.01); *G02F 1/133603* (2013.01); *G02F 2001/133612* (2013.01); *G02F 2001/133618* (2013.01); *G02F 2001/133626* (2013.01); *G09G 3/36* (2013.01); *G09G 2320/0247* (2013.01); *G09G 2330/02* (2013.01); *G09G 2330/021* (2013.01); *H05B 33/08* (2013.01)

(58) Field of Classification Search
CPC .................................................... H05B 33/0815
USPC ........................................................ 315/307
See application file for complete search history.

(56) References Cited

U.S. PATENT DOCUMENTS

| 7,348,958 B2 | 3/2008 | Park |
| 2003/0164815 A1 | 9/2003 | Nagatani |
| 2005/0200312 A1 | 9/2005 | Komiya et al. |
| 2007/0120506 A1 | 5/2007 | Grant |
| 2008/0018266 A1* | 1/2008 | Yu et al. ......................... 315/291 |
| 2008/0198615 A1 | 8/2008 | Klipstein |
| 2009/0160364 A1 | 6/2009 | Ackermann et al. |
| 2010/0148679 A1 | 6/2010 | Chen et al. |

FOREIGN PATENT DOCUMENTS

| CN | 1535060 A | 10/2004 |
| CN | 1946097 A | 4/2007 |
| KR | 20050100181 A | 10/2005 |
| KR | 10-0574159 | 4/2006 |

OTHER PUBLICATIONS

EP Examination Report for EP App No. 11833723.7 dated Oct. 7, 2014, 6 pgs.
Supplementary European Search Report for EP App No. 11833723.7 dated Oct. 18, 2013, 7 pgs.

* cited by examiner

*Primary Examiner* — Daniel Puentes
(74) *Attorney, Agent, or Firm* — Procopio, Cory, Hargeaves & Savitch LLP

(57) ABSTRACT

A method for controlling a backlight circuit, a backlight circuit and a boost circuit are provided by the present invention. The method comprises: acquiring a current backlight brightness level of a terminal; determining a minimum voltage required by a Light Emitting Diode (LED) to reach the backlight brightness level; and regulating a boost circuit to provide the minimum voltage for the LED. By way of the present invention, the endurance ability of the terminal is improved.

3 Claims, 3 Drawing Sheets

BACKLIGHT CIRCUIT CONTROL METHOD, BACKLIGHT CIRCUIT AND BOOSTER CIRCUIT

FIELD OF THE INVENTION

The present invention relates to communication field, and in particular to a method for controlling a backlight circuit, a backlight circuit and a boost circuit.

BACKGROUND OF THE INVENTION

Currently, Liquid Crystal Displays (abbreviated as LCD) are usually used in terminals, and the backlight brightness of the LCDs greatly affects the imaging effects. Light Emitting Diodes (LED) are applied as backlight emitting devices, and usually, an anode of a LED is connected to a positive pole of a battery, and a cathode of the LED is in series connection with a brightness balancing resistor and then connected to a current control end.

The number of the LEDs required by the terminals is relevant to the display area of the LCD and the emitting power of the LED. However, there is a disadvantage in this circuit: the battery voltage gradually reduces over the working time, and when the battery voltage reduces to a certain extent, the backlight brightness cannot be ensured; in addition, when the power of the whole machine fluctuates, the backlight brightness could also fluctuate. For example, when an entertainment terminal plays a video and uses a built-in loudspeaker, if the battery voltage is insufficient, the backlight brightness could flicker with the music, and the lower the battery voltage, the higher the brightness level, the greater the volume of the loudspeaker, the more apparent the fluctuation of the backlight brightness.

In order to solve the above problem, in the related art, a backlight circuit with a boost circuit is employed in some terminal products, and the advantage of such circuit is: when the battery voltage is relatively low, the LED backlight can still obtain relatively high working voltage from the boost circuit. In this way, the backlight brightness could not flicker with the fluctuation of the power of the whole machine.

Although, the backlight circuit with a boost circuit solves the problem that the brightness fluctuates when the power of the whole machine fluctuates under a low voltage condition, the additional power consumption is often brought along. For example, for a terminal product, one lithium battery is employed to supply power, the voltage of the lithium battery is about 4.2 V when being fully charged, and the voltage for the terminal to power off automatically is about 3.3 V. The boost circuit of the backlight circuit of the terminal provides a fixed 4.3 V voltage to the LED. The brightness of some terminals can be regulated, it need not provide a 4.3 V voltage to the backlight under low brightness condition, the excessive voltage can be consumed at the control end, which results into heat loss and reduces the endurance ability of the terminal.

SUMMARY OF THE INVENTION

A method for controlling a backlight circuit, a backlight circuit and a boost circuit are provided by the present invention, so as to at least solve the above problems.

A method for controlling a backlight circuit is provided according to one aspect of the present invention, comprising: acquiring a current backlight brightness level of a terminal; determining a minimum voltage required by a Light Emitting Diode (LED) to reach the backlight brightness level; and regulating a boost circuit to provide the minimum voltage for the LED.

Preferably, determining the minimum voltage required by the LED to reach the backlight brightness level comprises: determining the minimum voltage according to a current value corresponding to the backlight brightness level.

Preferably, the minimum voltage is a sum of a voltage of the LED and a voltage of a resistor in series connection with the LED plus a voltage of a current control end, wherein the current control end is used for regulating a current of the LED to a value required by the backlight brightness level, and the voltage of the circuit control end is a minimum voltage of a current required by the current control end to stabilize an output to the backlight brightness level.

Preferably, the minimum voltage is a sum of a voltage of the LED and a voltage of a resistor in series connection with the LED plus a voltage of a current control end and plus a security voltage, wherein the current control end is used for regulating a current of the LED to a value required by the backlight brightness level, and the voltage of the circuit control end is a minimum voltage of a current required by the current control end to stabilize an output to the backlight brightness level, and the security voltage is used for improving the minimum voltage so as to determine stability of the backlight brightness when a power fluctuates.

Preferably, the above method further comprises: in the situation where a voltage of a terminal power source is greater than or equal to the minimum voltage, closing the boost circuit, and the terminal power source supplying a voltage to the LED.

A backlight circuit is provided according to another aspect of the present invention, comprising: an acquisition module, configured to acquire a current backlight brightness level of a terminal; a voltage determination module, configured to determine a minimum voltage required by a Light Emitting Diode (LED) to reach the backlight brightness level; and a regulation module, configured to regulate a boost circuit to provide the minimum voltage for the LED.

Preferably, the voltage determination module is configured to determine the minimum voltage according to a current value corresponding to the backlight brightness level.

Preferably, the minimum voltage determined by the voltage determination module is a sum of a voltage of the LED and a voltage of a resistor in series connection with the LED plus a voltage of a current control end, wherein the current control end is used for regulating a current of the LED to a value required by the backlight brightness level, and the voltage of the circuit control end is a minimum voltage of a current required by the current control end to stabilize an output to the backlight brightness level.

Preferably, the minimum voltage determined by the voltage determination module is a sum of a voltage of the LED and a voltage of a resistor in series connection with the LED plus a voltage of a current control end and plus a security voltage, wherein the current control end is used for regulating a current of the LED to a value required by the backlight brightness level, and the voltage of the circuit control end is a minimum voltage of a current required by the current control end to stabilize an output to the backlight brightness level, and the security voltage is used for improving the minimum voltage so as to determine stability of the backlight brightness when a power fluctuates.

A boost circuit is also provided according to yet another aspect of the present invention applied in a backlight circuit, wherein the boost circuit is configured to provide a minimum voltage required to reach a current backlight brightness level to an LED of the backlight circuit by way of a regulation of a voltage.

By way of the present invention, the current backlight brightness level of the terminal is acquired, the minimum voltage required by a light emitting diode (LED) to reach the backlight brightness level is determined; and the boost circuit is regulated to provide the minimum voltage for the LED. The problems, that heat loss is caused and the endurance ability of the terminal is reduced since the boost circuit provides a fixed voltage in the related art, are solved, and thereby the endurance ability of the terminal is improved.

BRIEF DESCRIPTION OF THE DRAWINGS

The drawings illustrated herein provide a further understanding of the present invention and form a part of the present application. The exemplary embodiments and the description thereof are used to explain the present invention without unduly limiting the scope of the present invention. In the drawings.

DETAILED DESCRIPTION OF EMBODIMENT

The present invention will be described hereinafter in detail with reference to the drawings and in conjunction with embodiments. It needs to be noted that the embodiments of the present invention and the features in the embodiments can be combined with each other if there is no conflict.

In the following embodiments, the screen brightness of a terminal provides one or more backlight brightness levels (or referred to as backlight level or brightness level) to be configured by a user, and in the related art, the backlight circuit with a boost circuit only provides a fixed voltage value, although such processing can make the screen not flicker due to the reduction of the battery voltage and the fluctuation of the power of the whole machine whether the screen works at the maximum brightness or the minimum brightness. However, the LED backlight circuit with a boost circuit always provides sufficient voltages at the output end, in this way, the voltages provided at low brightness level could be excessive, and these voltages will be allocated to other circuits (such as current control circuits) which can result into unnecessary heat loss, and reduce the endurance ability of the terminal. The following embodiments aim at those LED backlight circuits with boost circuits, and can reduce backlight power consumption and improve the endurance ability of the terminal product in case of not affecting the normal use of the terminal product.

In the following embodiments, the output voltage of the boost circuit will no longer be a fixed value. Under the high backlight brightness level, the boost circuit is configured with a high voltage output value; and under the backlight brightness level, the boost circuit is configured with a low voltage output value. In this way, the voltage surplus at a current control end could be minimum, and the generated heat loss could also be minimum. Thus, the energy saving purpose is achieved.

Figure 1:
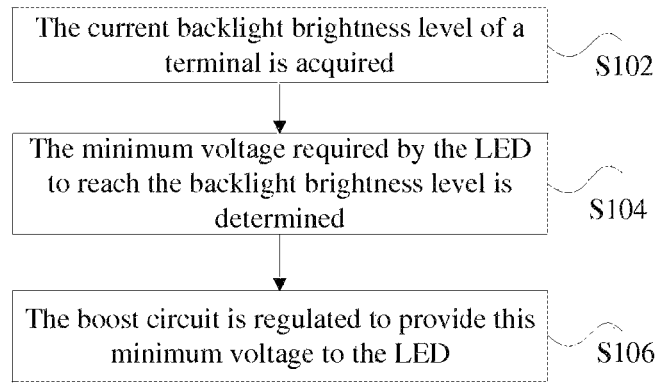
FIG. 1 is a flowchart of a method for controlling a backlight circuit according to embodiments of the present invention.

FIG. 1 is a flowchart of a method for controlling a backlight circuit according to embodiments of the present invention, and as shown in FIG. 1, this flow comprises the following steps.

Step S102, a current backlight brightness level of a terminal is acquired;

Step S104, a minimum voltage required by a light emitting diode (LED) to reach the current backlight brightness level is determined; and Step S106, a boost circuit is regulated to provide this minimum voltage to the LED.

By way of the above steps, the voltage provided by the boost circuit can be regulated, so that a relatively low voltage can be provided at a relatively low brightness. Thus, as compared to the boost circuit in the related art which only provided a fixed voltage, the heat loss is reduced.

Preferably, during implementation, if the purpose of changing the backlight brightness is achieved by way of regulating the current in the LED, then different backlight brightness levels correspond to different current levels. The greater the working current of the LED, the higher the voltages at both ends of the LED; and in contrast, the smaller the working current of the LED, the lower the voltages at both ends of the LED. In such situation, the minimum voltage can be determined by way of the current value corresponding to the backlight brightness level.

If the backlight brightness level is regulated by regulating the current, then this work of regulating the current can be done by the current control end. At this moment, the minimum voltage can be the sum of the voltage of the LED and the voltage of the resistor in series connection with the LED plus a voltage of the current control end, wherein the current control end is used for regulating the current of the LED to the value required by the backlight brightness level, and the voltage of the circuit control is the minimum voltage of the current required by the current control end to stabilize the output to the backlight brightness level. In order to better stabilize the backlight brightness, the minimum voltage can be the sum of the voltage of the LED and the voltage of the resistor in series connection with the LED plus the voltage of the current control end and plus a security voltage, wherein the security voltage (e.g. 0.2 V) is used for improving the minimum voltage so as to determine the stability of the backlight brightness when the power fluctuates.

Preferably, in order to prevent the boost circuit working in a buck state, in the situation where the power source voltage of the terminal is greater than or equal to the minimum voltage, the boost circuit can be closed, and the power source provides a voltage to the LED.

Figure 2:
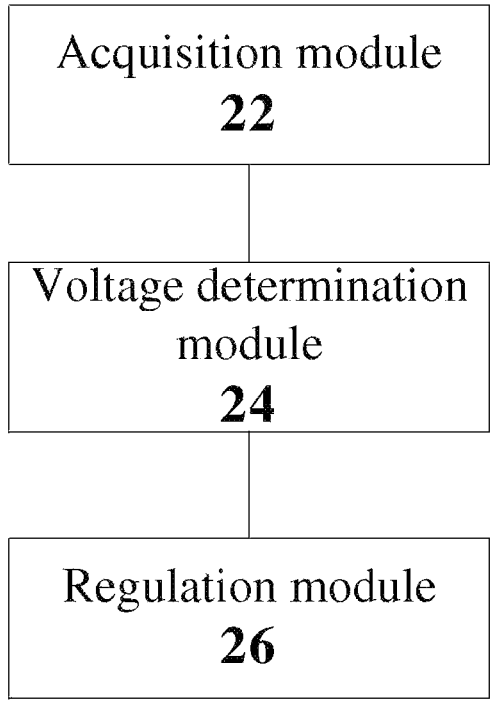
FIG. 2 is a structural block diagram of a backlight circuit according to embodiments of the present invention.

FIG. 2 is a structural block diagram of a backlight circuit according to embodiments of the present invention. This backlight circuit is used to implement the above embodiments and the preferred embodiments thereof, and what has been described does not need to be described herein. Hereinafter, only those modules involved in this circuit will be described. As shown in FIG. 2, this backlight circuit comprises: an acquisition module 22, a voltage determination module 24, and a regulation module 26, and this structure will be described below.

The acquisition module 22 is configured to acquire a current backlight brightness level of a terminal; the voltage determination module 24 connected to the acquisition module 22 is configured to determine a minimum voltage required by a light emitting diode (LED) to reach the backlight brightness level; and the regulation module 26 connected to the voltage determination module 24 is configured to regulate a boost circuit to provide the minimum voltage for the LED.

Preferably, the voltage determination module 24 is configured to determine the minimum voltage according to a current value corresponding to the backlight brightness level.

Preferably, the minimum voltage determined by the voltage determination module 24 is the sum of the voltage of the LED and the voltage of the resistor in series connection with the LED plus a voltage of a current control end, wherein the current control end is used for regulating the current of the LED to the value required by the backlight brightness level, and the voltage of the circuit control is the minimum voltage of the current required by the current control end to stabilize the output to the backlight brightness level.

Preferably, the minimum voltage determined by the voltage determination module 24 is the sum of the voltage of the LED and the voltage of the resistor in series connection with the LED plus the voltage of the current control end and plus a security voltage, wherein the current control end is used for regulating the current of the LED to the value required by the backlight brightness level, and the voltage of the circuit control is the minimum voltage of the current required by the current control end to stabilize the output to the backlight brightness level, and the security voltage is used for improving the minimum voltage so as to determine the stability of the backlight brightness when the power fluctuates.

In this embodiment, a boost circuit is also provided and applied in a backlight circuit, wherein the boost circuit is used for providing the minimum voltage required to reach the current backlight brightness level to the LED of the backlight circuit by way of the regulation of the voltage.

Figure 3:
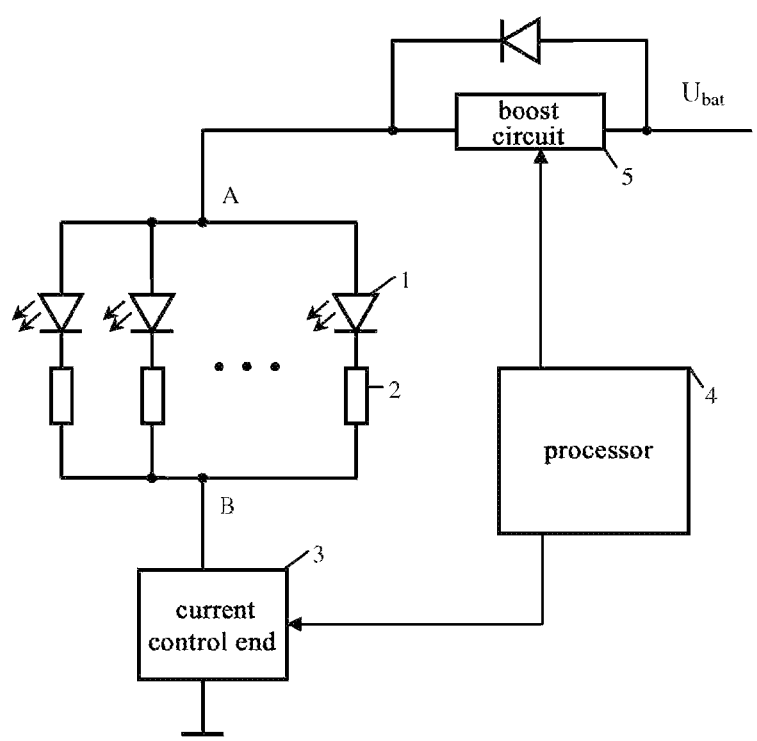
FIG. 3 is a schematic diagram of a LED backlight circuit with a boost circuit according to embodiments of the present invention.

FIG. 3 is a schematic diagram of a LED backlight circuit with a boost circuit according to embodiments of the present invention, and as shown in FIG. 3, this backlight circuit comprises: an LED 1, a brightness balancing resistor 2, a current control end 3, a processor 4 (for implementing the functions of the above acquiring module 22, voltage determination module 24 and regulation module 26) and a (programmable) boost circuit 5. Hereinafter, a preferred embodiment will be described in conjunction with FIG. 3.

In this preferred embodiment, the regulation of the backlight brightness is achieved by way of controlling the current amplitude at the current control end, and if the voltage provided by the LED with the boost circuit is too high, it will cause the current at the current control end to be too high and cause unnecessary heat loss. An experiment is carried out on a certain mobile phone, Tables 1 and 2 are power situations of a terminal (such as a mobile phone) during the input voltage changes at the same brightness (same backlight current) when the backlight voltage is respectively 4.3 V and 5 V (i.e. simulation battery input voltage).

TABLE 1

| Input voltage (V) | Current of whole machine (mA) | Whole machine power (mW) |
|---|---|---|
| 3.98 | 61.26 | 243.78 |
| 3.88 | 62.38 | 241.75 |
| 3.77 | 63.44 | 239.27 |
| 3.67 | 64.86 | 237.81 |
| 3.56 | 66.54 | 236.91 |
| 3.45 | 68.46 | 236.43 |

TABLE 2

| Input voltage (V) | Current of whole machine (mA) | Whole machine power (mW) |
|---|---|---|
| 3.96 | 66.74 | 264.27 |
| 3.85 | 68.38 | 263.53 |
| 3.75 | 69.89 | 261.98 |
| 3.64 | 71.40 | 260.11 |
| 3.54 | 72.97 | 258.12 |
| 3.43 | 74.77 | 256.52 |

It can be seen from the tables that when the input voltage is very approximate, such as 3.98 V in Table 1 and 3.96 V in Table 2, the whole machine powers corresponding to different backlight voltages are different, and the whole machine powers corresponding to lower backlight voltages are smaller. The above data indicates that low voltage can reduce the whole machine power under the premise of not affecting the backlight brightness.

The terminal products always provide several brightness levels on the interface for the user to select. Assuming that there are N brightness levels, the backlight current corresponding to every brightness level is $I_1, I_2, \ldots, I_N$; the sum of the voltage of the LED and the voltage of the series connected resistor corresponding to every brightness level is $U_{L1}, U_{L2}, \ldots, U_{LN}$; and the lowest voltage at the current control end corresponding to every brightness level is $U_{C1}, U_{C2}, \ldots, U_{CN}$.

The amplitude relationship of the backlight current is $I_1 < I_2 < \ldots < I_N$; the amplitude relationship of the sum of the voltage of the LED and the voltage of the series connected resistor is $U_{L1} < U_{L2} < \ldots < U_{LN}$; and the voltage amplitude relationship of current control end is $U_{C1} < U_{C2} < \ldots < U_{CN}$. The battery voltage $U_{BAT}$ is a variable, when the battery is fully charged, $U_{BAT}$ is a relatively great value, and with the prolonging of the endurance time of the terminal, $U_{BAT}$ gradually changes to a relatively low value.

At each brightness level, the voltage to be provided to the backlight should at least be $U_{L1}+U_{C1}, U_{L2}+U_{C2}, \ldots, U_{LN}+U_{CN}$, and for the sake of being safe, the voltage provided at each brightness level can be improved a little, assuming that this increased voltage is $U_{SAFE}$, so as to ensure that the backlight brightness could not fluctuate when the power fluctuates. In this way, the voltage to be provided by the boost circuit to each brightness level is $U_{L1}+U_{C1}+U_{SAFE}, U_{L2}+U_{C2}+U_{SAFE}, \ldots, U_{LN}+U_{CN}+U_{SAFE}$.

The boost output end of the backlight circuit which does not use an energy saving solution provides a sufficiently high voltage $U_{OUT}$; and $U_{OUT} > U_{BAT}, U_{OUT} > U_{LN}+U_{CN}+U_{SAFE}$. The efficiency at each brightness level is $(U_{L1}*I_1)/(U_{OUT}*I_1)$, $(U_{L2}*I_2)/(U_{OUT}*I_2), \ldots, (U_{LN}*I_N)/(U_{OUT}*I_N)$ respectively, and is $U_{L1}/U_{OUT}, U_{L2}/U_{OUT}, \ldots, U_{LN}/U_{OUT}$, after simplification. It can be seen that the lower the brightness level being set, the lower the efficiency thereof.

The boost output end of the backlight circuit employing the energy saving solution of this embodiment does not always provide a very high voltage but to provide a normally working lowest voltage for each brightness level, with the voltage value thereof being $U_{L1}+U_{C1}+U_{SAFE}, U_{L2}+U_{C2}+U_{SAFE}, \ldots, U_{LN}+U_{CN}+U_{SAFE}$. The efficiency thereof at each brightness level is $U_{L1}/(U_{L1}+U_{C1}+U_{SAFE}), U_{L2}/(U_{L2}+U_{C2}+U_{SAFE}), \ldots, U_{LN}/(U_{LN}+U_{CN}+U_{SAFE})$ respectively. Since $(U_{L1}+U_{C1}+U_{SAFE}) < (U_{L2}+U_{C2}+U_{SAFE}) < \ldots < U_{LN}+U_{CN}+U_{SAFE} < U_{OUT}$, the efficiency is improved after the energy saving solution has been employed.

It needs to be noted that in order to prevent the boost circuit working in a buck state, when the voltage calculation value outputted by the boost output end is lower than the battery voltage value, the boost circuit can be closed, and the backlight circuit can draw out current from the battery end via a bypass diode. That is, when the brightness level is N and $U_{BAT} \geq U_{LN}+U_{CN}+U_{SAFE}$, the boost circuit is closed, and the battery supplies power via the bypass diode (for simplification, the positive buck of the diode can be ignored, of course, the positive buck of the diode can be taken into account); when $U_{BAT} < U_{LN}+U_{CN}+U_{SAFE}$, the output voltage at the output end of the boost circuit is set as $U_{LN}+U_{CN}+U_{SAFE}$.

Now taking a mobile phone as an example for description, the backlight level of this mobile phone is 5. The backlight currents ($I_1$ to $I_5$) corresponding to brightness levels 1 to 5 are 10 mA, 20 mA, 30 mA, 40 mA, 50 mA respectively; the sum ($U_{L1}$ to $U_{L5}$) of the voltages of LED and the series connected resistor corresponding to brightness levels 1 to 5 (backlight current 10 to 50 mA) are 2.73 V, 2.84 V, 2.95 V, 3.04 V, 3.12 V respectively. It needs to be noted that if LEDs from different manufacturers are employed, the LED backlight voltages of different manufacturers with the same current level are different, and it is required to draw out the maximum value therein. Moreover, the VA curves of the LED backlight circuits of different manufacturers can be normalized by experiments. The lowest voltages ($U_{C1}$ to $U_{C5}$) being able to output stable current and corresponding to the current control end at brightness levels 1 to 5 (backlight current 10 to 50 mA) are 0.24 V, 0.25 V, 0.26 V, 0.27 V, 0.27 V respectively.

The lowest voltage provided to the LED backlight at brightness levels 1 to 5 are (2.73+0.24) V, (2.84+0.25) V, (2.95+0.26) V, (3.04+0.27) V, (3.12+0.27) V, i.e. 2.97 V, 3.09V, 3.21 V, 3.31 V, 3.39 V. Since there are errors in control, in order to ensure sufficient voltage at each brightness, the above lowest voltage is further improved by 0.2 V ($U_{SAFE}$), i.e. 3.17 V, 3.29 V, 3.41 V, 3.51 V, 3.59 V. Since the step value of the voltage regulation of the boost circuit of this mobile phone is 0.1 V, the above voltages have to be rounded (they cannot be rounded off, otherwise the voltage may be insufficient) as 3.2 V, 3.3 V, 3.5 V, 3.6 V, 3.6 V.

TABLE 3

| Brightness level | Control end current (mA) | Boost output voltage (V) |
|---|---|---|
| 1 | 10 | 3.2 |
| 2 | 20 | 3.3 |
| 3 | 30 | 3.5 |
| 4 | 40 | 3.6 |
| 5 | 50 | 3.6 |

It needs to be noted that in order to prevent the boost circuit working in the buck state, the battery voltage can be sampled by software and compared with the boost output voltage required by the set brightness level. If the battery voltage is higher than the boost output voltage, then the output of the boost circuit will be closed, and the backlight voltage can be provided by the battery via the bypass diode.

Figure 4:
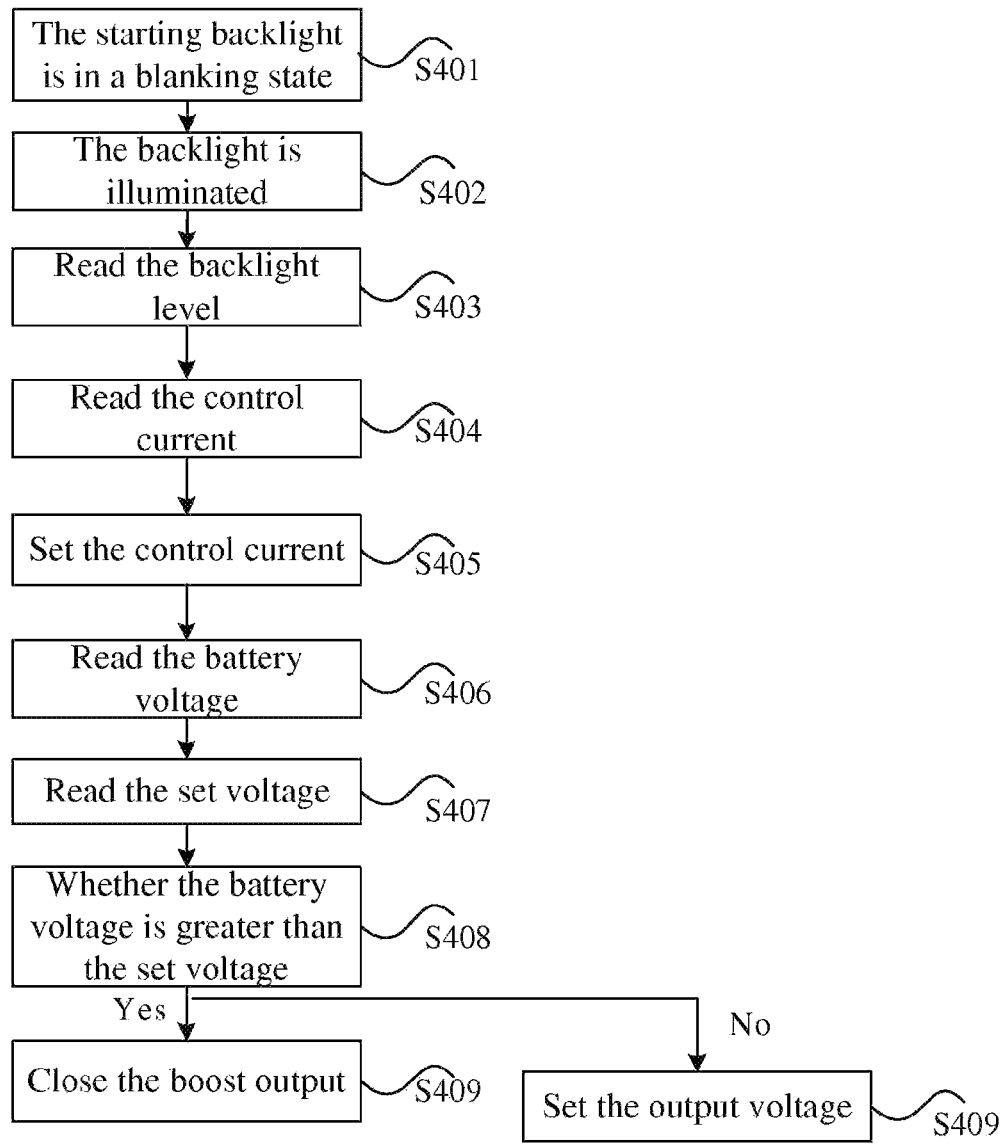
FIG. 4 is a flowchart of a preferred method for controlling a backlight circuit according to embodiments of the present invention.

FIG. 4 is a flowchart of a preferred method for controlling a backlight circuit according to embodiments of the present invention, and as shown in FIG. 4, this flow comprises the steps as follows.

Step S401, the starting backlight is in a blanking state.

Step S402, it is determined that the backlight has to be illuminated.

Step S403, a program reads the backlight levels set by the brightness.

Step S404, the corresponding control current is read from the list (such as Table 3).

Step S405, the control current is set.

Step S406, the current battery voltage is read from the list.

Step S407, the output voltage of the boost circuit is read from the list.

Step S408, the battery voltage and the required boost output voltage are compared.

Step S409, if the battery voltage is high, then the output of the boost circuit could be closed; otherwise, the output voltage of the boost circuit is set as the corresponding voltage in the list.

Experiment effects: Tables 4 to 6 are whole machine consumption reduction situations at brightness levels 1, 3, and 5 after the above mobile phone employs the energy saving solution as compared to the ordinary solution.

TABLE 4

Energy saving situations under different input voltages at brightness level 1

| Input voltage (V) | Energy saving solution current (mA) | Ordinary solution current (mA) | Consumption reduction (mW) | Consumption reduction rate (mW) |
|---|---|---|---|---|
| 4.20 | 44.90 | 46.90 | 8.40 | 4.26 |
| 4.10 | 43.70 | 47.20 | 14.35 | 7.42 |
| 4.00 | 44.00 | 47.90 | 15.60 | 8.14 |
| 3.90 | 44.70 | 48.90 | 16.38 | 8.59 |
| 3.80 | 44.70 | 49.50 | 18.24 | 9.70 |
| 3.70 | 45.00 | 50.30 | 19.61 | 10.54 |
| 3.60 | 45.00 | 66.30 | 76.68 | 32.13 |
| 3.50 | 46.10 | 66.50 | 71.40 | 30.68 |
| 3.40 | 46.20 | 66.80 | 70.04 | 30.84 |

TABLE 5

Energy saving situations under different input voltages at brightness level 3

| Input voltage (V) | Energy saving solution current (mA) | Ordinary solution current (mA) | Consumption reduction (mW) | Consumption reduction rate (mW) |
|---|---|---|---|---|
| 4.20 | 64.00 | 68.40 | 18.48 | 6.43 |
| 4.10 | 62.50 | 70.10 | 31.16 | 10.84 |
| 4.00 | 62.50 | 71.80 | 37.20 | 12.95 |
| 3.90 | 63.10 | 72.60 | 37.05 | 13.09 |
| 3.80 | 63.70 | 74.00 | 39.14 | 13.92 |
| 3.70 | 64.50 | 75.30 | 39.96 | 14.34 |
| 3.60 | 64.30 | 85.20 | 75.24 | 24.53 |
| 3.50 | 64.70 | 85.60 | 73.15 | 24.42 |
| 3.40 | 63.70 | 82.70 | 64.60 | 22.97 |

TABLE 6

Energy saving situations under different input voltages at brightness level 5

| Input voltage (V) | Energy saving solution current (mA) | Ordinary solution current (mA) | Consumption reduction (mW) | Consumption reduction rate (mW) |
|---|---|---|---|---|
| 4.20 | 81.80 | 90.00 | 34.44 | 9.11 |
| 4.10 | 81.20 | 91.70 | 43.05 | 11.45 |
| 4.00 | 81.50 | 93.60 | 48.40 | 12.93 |
| 3.90 | 81.80 | 95.10 | 51.87 | 13.99 |
| 3.80 | 81.90 | 97.60 | 59.66 | 16.09 |
| 3.70 | 82.10 | 98.80 | 61.79 | 16.90 |
| 3.60 | 81.30 | 99.20 | 64.44 | 18.04 |
| 3.50 | 74.00 | 93.00 | 66.50 | 20.43 |
| 3.40 | 68.90 | 87.90 | 64.60 | 21.62 |

It can be seen from the above experiment data that the application of the energy saving solution in this preferred embodiment has apparent energy saving effects.

In summary, as to the LED circuit with the boost circuit, after the above embodiments have been employed, the backlight power consumption is reduced to the greatest extent without affecting user experience, which effectively improves the endurance ability of the terminal.

Obviously, those skilled in the art should understand that the above modules or steps of the present invention can be implemented using a general-purpose computing apparatus, and they can be integrated on a single computing apparatus or distributed over a network consisted of multiple computing apparatus; optionally, they can be implemented using computing apparatus executable program code, thus, they can be stored in a storage for being executed by the computing apparatus, and in some cases, the shown or described steps can be performed in an order different from the order here, or they can be made into various integrated circuit modules respectively, or some modules or steps therein are made into a single integrated circuit module for implementation. In this way, the present invention is not limited to any particular combination of hardware and software.

Above description is only to illustrate the preferred embodiments but not to limit the present invention. Various alternations and changes to the present invention are apparent to those skilled in the art. The scope defined in claims shall comprise any medication, equivalent substitution and improvement within the spirit and principle of the present invention.

What is claimed is:

1. A method for controlling a backlight circuit, comprising:
acquiring a current backlight brightness level of a terminal;
determining a minimum voltage required by a Light Emitting Diode (LED) to reach the backlight brightness level; and
regulating a boost circuit to provide the minimum voltage for the LED;
wherein the determining the minimum voltage required by the LED to reach the backlight brightness level comprises:
determining the minimum voltage according to a current value corresponding to the backlight brightness level;
wherein the minimum voltage is a sum of a voltage of the LED and a voltage of a resistor in series connection with the LED plus a voltage of a current control end and plus a security voltage, wherein the current control end is used for regulating a current of the LED to a value required by the backlight brightness level, and the voltage of the current control end is a minimum voltage of a current required by the current control end to stabilize an output to the backlight brightness level, and the security voltage is used for improving the minimum voltage so as to determine stability of the backlight brightness when a power fluctuates.

2. The method according to claim 1, wherein the method further comprises:
in the situation where a voltage of a terminal power source is greater than or equal to the minimum voltage, closing the boost circuit, and the terminal power source supplying a voltage to the LED.

3. A backlight circuit, comprising:
an acquisition module, configured to acquire a current backlight brightness level of a terminal;
a voltage determination module, configured to determine a minimum voltage required by a Light Emitting Diode (LED) to reach the backlight brightness level; and
a regulation module, configured to regulate a boost circuit to provide the minimum voltage for the LED;
wherein the voltage determination module is configured to determine the minimum voltage according to a current value corresponding to the backlight brightness level;
wherein the minimum voltage determined by the voltage determination module is a sum of a voltage of the LED and a voltage of a resistor in series connection with the LED plus a voltage of a current control end and plus a security voltage, herein the current control end is used for regulating a current of the LED to a value required by the backlight brightness level, and the voltage of the current control end is a minimum voltage of a current required by the current control end to stabilize an output to the backlight brightness level, and the security voltage is used for improving the minimum voltage an as to determine stability of the backlight brightness when a power fluctuates.

* * * * *